(12) United States Patent
Pischke

(10) Patent No.: US 12,458,093 B2
(45) Date of Patent: Nov. 4, 2025

(54) HELMET MOUNT FOR POWERED DEVICE

(71) Applicant: Sellmark Corporation, Mansfield, TX (US)

(72) Inventor: Andrew Pischke, Mansfield, TX (US)

(73) Assignee: Sellmark Corporation, Mansfield, TX (US)

( * ) Notice: Subject to any disclaimer, the term of this patent is extended or adjusted under 35 U.S.C. 154(b) by 287 days.

(21) Appl. No.: 18/149,788

(22) Filed: Jan. 4, 2023

(65) Prior Publication Data

US 2024/0215674 A1    Jul. 4, 2024

(51) Int. Cl.
*A42B 3/04* (2006.01)
*H01R 4/30* (2006.01)
*H01R 11/01* (2006.01)

(52) U.S. Cl.
CPC ............. *A42B 3/0406* (2013.01); *H01R 4/30* (2013.01); *H01R 11/01* (2013.01)

(58) Field of Classification Search
CPC ...... A42B 3/0406; H01R 25/162; H01R 4/30; H01R 11/01
See application file for complete search history.

(56) References Cited

U.S. PATENT DOCUMENTS

| | | |
|---|---|---|
| 2,103,072 A | 12/1937 | Frank |
| 3,246,074 A | 4/1966 | Manfred et al. |
| 5,226,181 A | 7/1993 | Polednak et al. |
| 5,683,831 A * | 11/1997 | Baril .................. G02B 27/0176 429/96 |
| 6,457,179 B1 * | 10/2002 | Prendergast ......... G02B 23/125 2/6.2 |
| 6,662,370 B1 | 12/2003 | Buchanan, Jr. |
| 7,219,370 B1 | 5/2007 | Teetzel et al. |
| 7,726,994 B1 | 6/2010 | Willey |
| 8,431,881 B2 | 4/2013 | Filipovich et al. |

(Continued)

FOREIGN PATENT DOCUMENTS

EP    4080688 A1    10/2022

OTHER PUBLICATIONS

Norotos, Inc. Standard Rugged Helmet Mount (1701010), https://www.norotos.com/shop/prodView.asp?dproduct=54, ca. Dec. 2022.

(Continued)

*Primary Examiner* — Katharine G Kane
(74) *Attorney, Agent, or Firm* — Mark D. Perdue

(57) ABSTRACT

An apparatus for mounting an electrically powered device to a helmet has a mounting body configured to be removably secured to an existing mounting fixture on the helmet and depending generally downwardly therefrom. A device-mounting rail is carried by the mounting body and has a length extending generally transversely to each side of the mounting body. At least one longitudinal slot is formed in the device-mounting rail and an electrically conductive rail is carried on the device rail and at least partially coextensive with the longitudinal slot, the electrically conductive rail configured to mate with a receptacle on the device. A fastener extends through the longitudinal slot to engage and secure the device to the device-mounting rail. A source of electrical power is in communication with the device through the electrically conductive rail and receptacle.

14 Claims, 3 Drawing Sheets

(56) References Cited

U.S. PATENT DOCUMENTS

| | | | |
|---|---|---|---|
| 8,792,041 B2* | 7/2014 | Green | G01S 17/875 |
| | | | 348/335 |
| 8,908,389 B2 | 12/2014 | Teetzel et al. | |
| 8,984,665 B2 | 3/2015 | Celona et al. | |
| 9,113,129 B2 | 8/2015 | Teetzel et al. | |
| 9,532,621 B2 | 1/2017 | Redpath et al. | |
| 9,622,529 B2 | 4/2017 | Teetzel et al. | |
| 9,709,792 B2 | 7/2017 | Teetzel et al. | |
| 11,360,309 B2 | 6/2022 | Goupil et al. | |
| 11,452,328 B2 | 9/2022 | Franzino et al. | |
| 2003/0025828 A1* | 2/2003 | Ramonowski | H04N 23/50 |
| | | | 348/E5.025 |
| 2006/0072007 A1* | 4/2006 | Gilor | F16M 11/10 |
| | | | 348/61 |
| 2014/0020159 A1* | 1/2014 | Teetzel | A42B 3/04 |
| | | | 2/422 |
| 2018/0310656 A1* | 11/2018 | Ford | A42B 3/0453 |
| 2018/0314052 A1* | 11/2018 | Prendergast | G02B 23/16 |
| 2018/0368505 A1* | 12/2018 | Kidman | A42B 3/042 |
| 2022/0352743 A1* | 11/2022 | Barron | H02S 10/40 |
| 2024/0164464 A1* | 5/2024 | Teetzel | A42B 3/0406 |
| 2024/0204328 A1* | 6/2024 | Teetzel | H01M 50/244 |

OTHER PUBLICATIONS

Tactical Night Vision Company, AB Night Vision STORM Mount for ANVIS, https://tnvc.com/shop/ab-night-vision-storm-mount-for-anvis/, ca. Dec. 2022.

Wilcox Industries Corp,, G24 Mount, https://wilcoxind.com/products/mounting-systems/mount-shroud-combinations, ca/ Dec. 2022.

Wilcox Industries Corp., Wilcox Modular Powered Track J-Hook Configuration, ca. Dec. 2022.

* cited by examiner

HELMET MOUNT FOR POWERED DEVICE

BACKGROUND OF THE INVENTION

1. Field of the Invention

The invention relates to apparatus for securing or mounting devices or accessories to a helmet. More particularly, the invention relates to apparatus for securing electrically powered devices, such as night-vision devices, to military or "tactical" helmets.

2. Summary of the Prior Art

Numerous devices exist for securing various optical and other accessories to a military or tactical helmet for "hands-free" and selective use of the device. Such devices became increasingly common with the advent of night-vision technologies, that are often used intermittently, as conditions dictate.

The front or forward portion of a military or tactical helmet provides a relatively stable platform for mounting such devices, but due to variations in the size of the helmets and individual wearers "articulation" or "adjustability" of the device, usually through the mounting, is typically required. Much of the articulation is provided by the fixture or mount that is semi-permanently mounted to the helmet.

Although there is no standardization of these helmet fixtures, two models have become de facto standards: the Standard Helmet Mount, PN 1701010, sold by Norotos, Inc., 201 East Alton Avenue, Santa Ana, CA 92707; and the G24 Mount, sold by Wilcox Industries Corp., One Wilcox Way, Newington, NH 03801 USA. These mounts provide the ability to move the device or accessory attached to them up and out of the field of vision of the helmet wearer, as well as some ability to pivot and rotate the device or accessory relative to the eyes and face of the helmet wearer.

Rather than mount the device or accessory directly to the fixture, a mount, sometimes called a "shoe," is secured to the fixture, and the device or accessory to the mount or shoe. The mount then provides additional functionality to the helmet fixtures, including options for mounting the device, power delivery to the device, and the like.

A need exists, therefore, for mounts or shoes to be secured to the helmet fixture and provide a mount for the device that provide increased functionality and ease of use of the entire assembly.

SUMMARY OF THE INVENTION

It is a general object of the present invention to provide an improved helmet mounting device for releasably securing an electrically powered optical device to a helmet.

This and other objects of the invention are achieved by an apparatus for mounting an electrically powered device to a helmet comprising a mounting body configured to be removably secured to an existing mounting fixture on the helmet and depending generally downwardly therefrom. A device-mounting rail is carried by the mounting body and has a length extending generally transversely to each side of the mounting body. At least one longitudinal slot is formed in the device-mounting rail and an electrically conductive rail is carried on the device rail and at least partially coextensive with the longitudinal slot, the electrically conductive rail configured to mate with a receptacle on the device. A fastener extends through the longitudinal slot to engage and secure the device to the device-mounting rail. A source of electrical power is in communication with the device through the electrically conductive rail and receptacle.

According to one embodiment of the present invention, the at least one longitudinal slot further comprises a pair of longitudinal slots, each longitudinal slot formed in the device-mounting rail on each side of the mounting body, and the electrically conductive rail is generally coextensive with both longitudinal slots.

According to another embodiment of the present invention, the source of electrical power is remote from the mounting body and electrically connected to it by a cable.

According to still another embodiment of the present invention, the mounting body further comprises a mounting-fixture portion that is configured to be removably secured to the existing mounting fixture, the mounting fixture portion being removably secured to the mounting body.

Other objects, features, and advantages of the present invention will become apparent to those of ordinary skill in the art with reference to the detailed description of the invention, which follows.

DETAILED DESCRIPTION OF THE INVENTION

Figure 1:
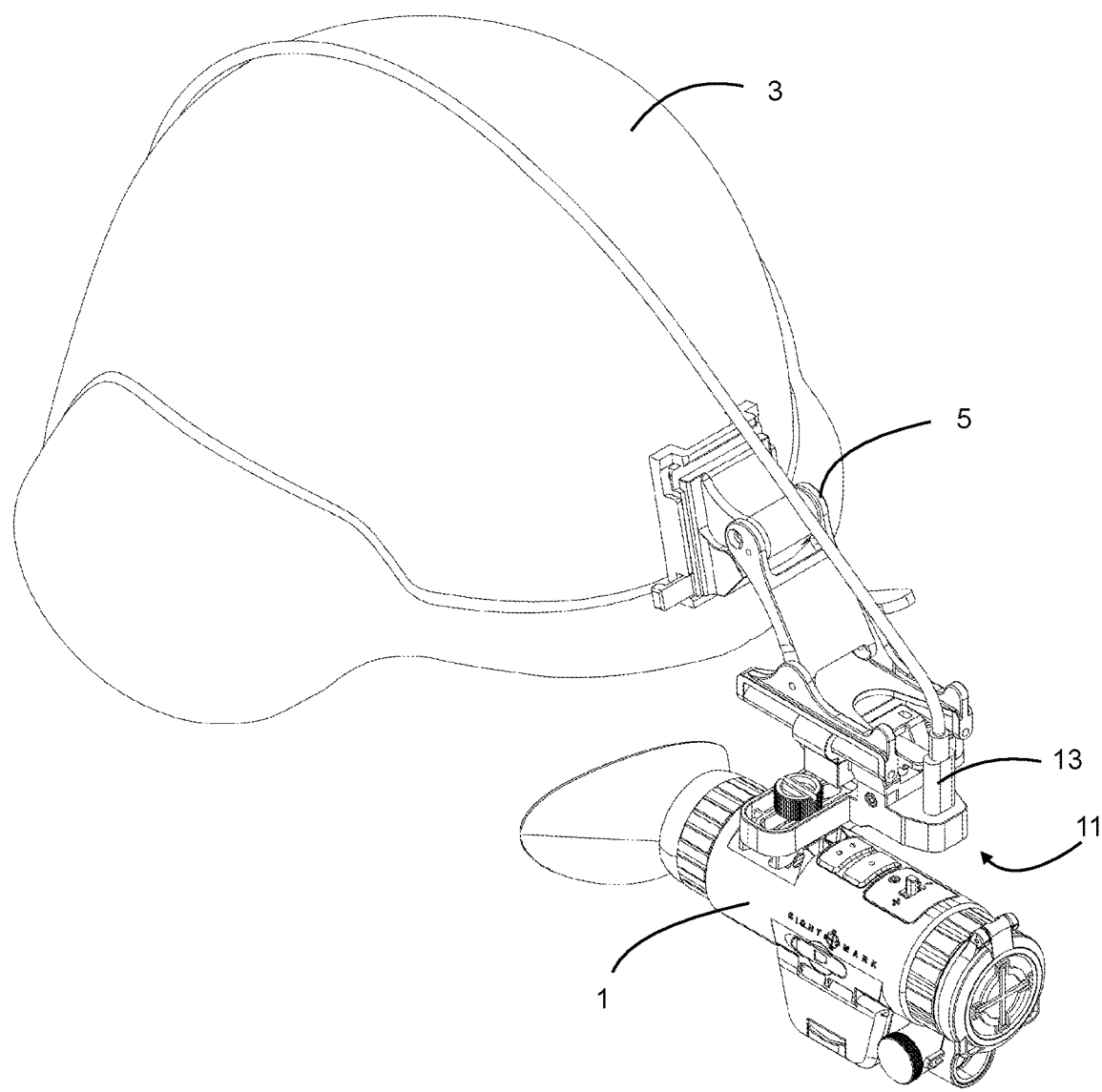
FIG. 1 is an environmental perspective view of a helmet, helmet fixture, device, and the mount according to an embodiment of the present invention.

Turning now to the Figures, and particularly to FIG. 1, a device 1 is illustrated connected or secured to a military or tactical helmet 3 by an existing helmet fixture 5 and a mount 11 according to the present invention. The device 1 depicted is a night-vision monocular, but may comprise other devices, including night- or day-vision binoculars, monoculars, laser rangefinding devices and the like. Typically, or preferably, device 1 is electrically powered.

Helmet fixture 5 does not form a part of the present invention, but only its environment, and the illustrated fixture or mount 5 is the Norotos Standard Helmet Mount referred to above, but may be any of the available helmet mounts or fixtures, coupled to helmet 1 in accordance with manufacturer instructions and hardware.

Device mount 11 may be releasably or detachably secured to fixture 5, and device 1 may be in turn releasably or detachably secured to mount 11. An adapter, or upper or fixture portion (23 in FIG. 2) may be provided at an upper extent of mount 11 as a removable or detachable portion to adapt to the particular helmet fixture 5 to which mount 11 may be secured. An electric power cable may be connected by plug 13 to mount 11 via USB or similar connection and may be connected at its opposite end to a source of electrical power (typically a battery pack), which may be carried on the rear of the helmet or on the belt or web gear or other location on the helmet wearer.

Figure 2:
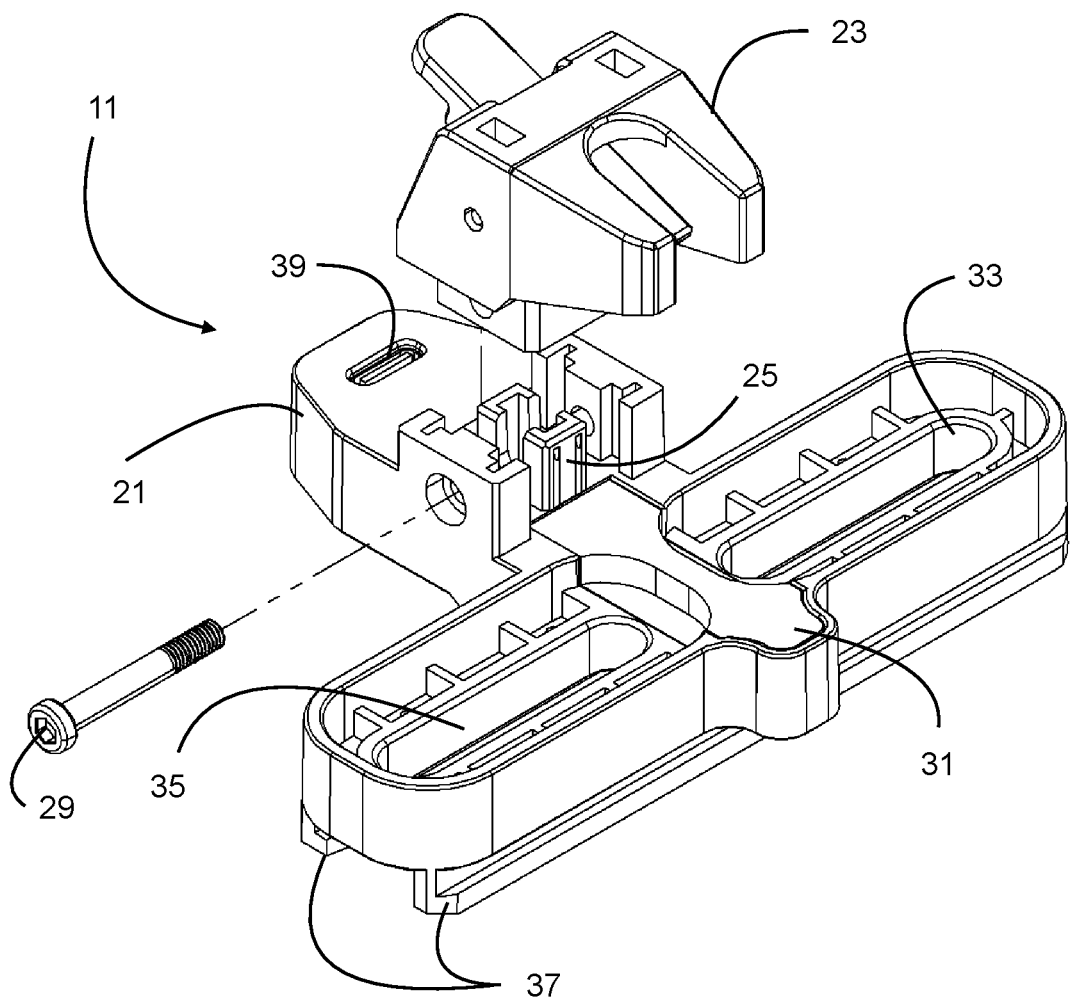
FIG. 2 is a partially exploded perspective view of the device mount according to an embodiment of the present invention.
Figure 3:
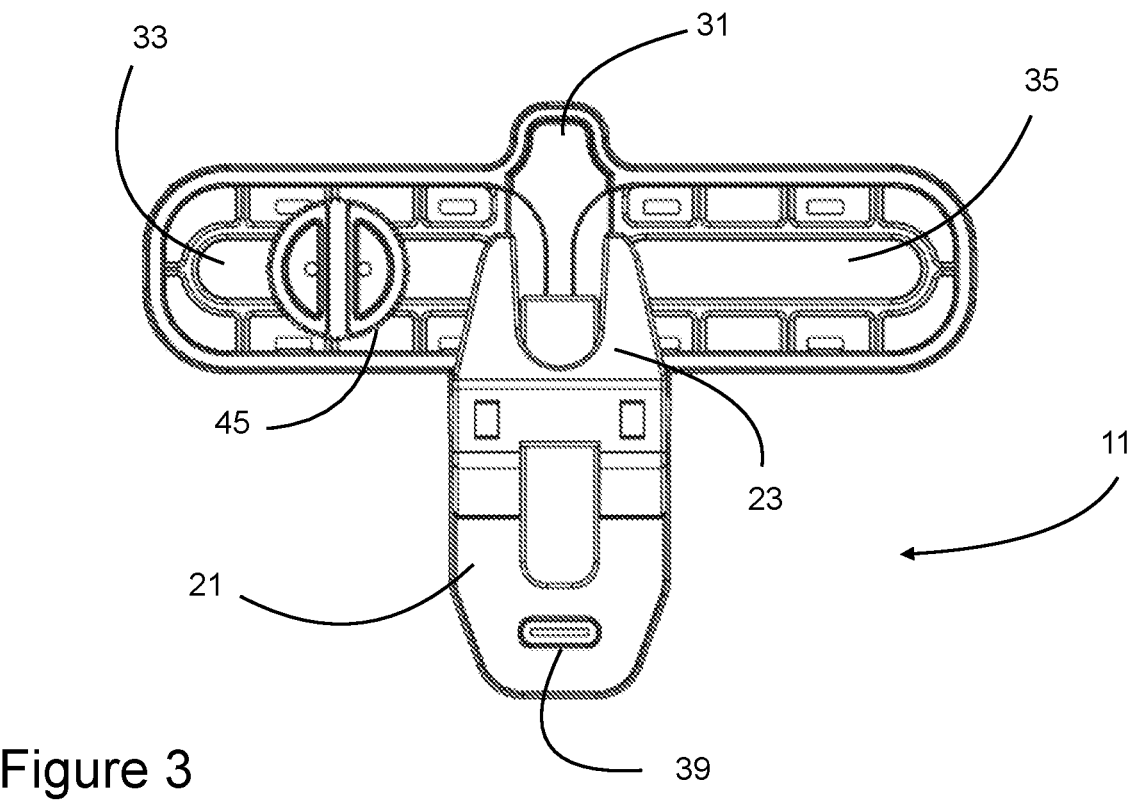
FIG. 3 is a top plan view of the device mount according to an embodiment of the present invention.
Figure 4:
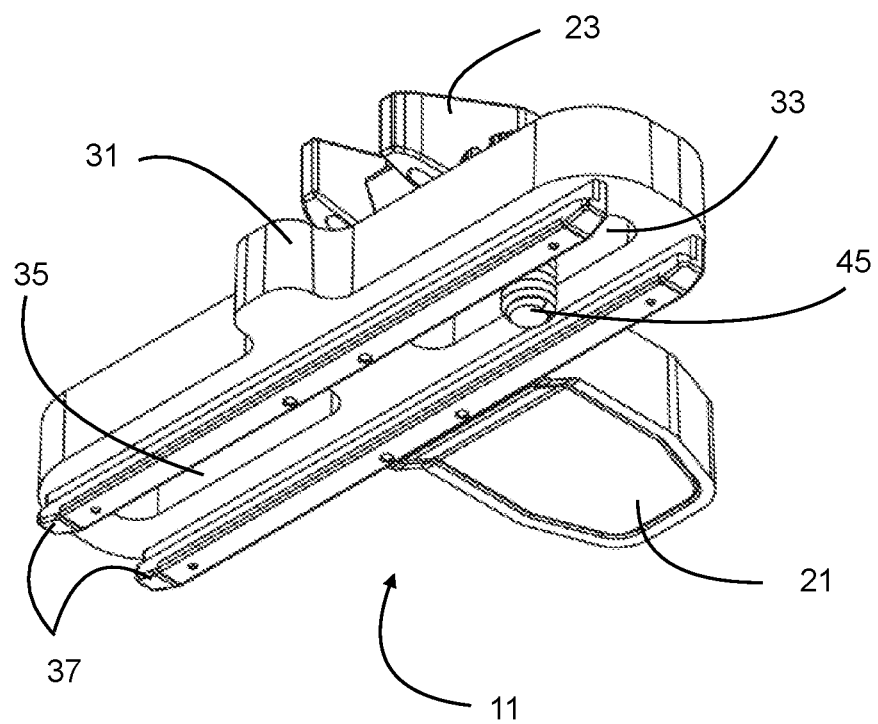
FIG. 4 is a bottom perspective view of the device mount according to an embodiment of the present invention.

Referring now to FIGS. 2 through 4, mount 11 is described in greater detail. Mount 11 may comprise a mounting body 21 having an upper or fixture portion or adapter 23 that may be configured to mate with helmet fixture 5. Fixture portion 23 may be coupled or secured to mounting body 21 by stakes or projections 25 in mounting body 21 (and mating recesses or receptacles in upper fixture portion or adapter 23). A fastener, preferably a threaded screw 29, may secure fixture portion 23 to mounting body 21 via through-hole in mounting body 21.

A device-mounting rail 31 may extend rearwardly and from a lower extent of mounting body 21. Rail 31 may extend to either side of mounting body 21. At least one, and preferably a pair of longitudinal slots 33, 35 (FIGS. 2 and 4), may be formed in device mounting rail 31, again, to either side of mounting body 21. A pair of parallel, spaced-apart electrically conductive rails 37 having an L-shaped cross-section may be provided at a lower extent of device-mounting rail 31. Conductive rails 37 preferably may extend the length of device mounting rail 31, but should be at least generally coextensive with the length of each of longitudinal slots 33, 35, so as to provide an electrical and mechanical connection for a device 1 at any point along the length of slot or slots 33, 35. An electrical connection, preferably a USB Type C port 39, may be provided in mounting body 21 and is in electrical communication with conductive rails 37. At least one fastener, preferably a tool-less, hand-operated thumbscrew 45 (FIGS. 3 and 4), may extend through each longitudinal slot and into a threaded receptacle into device 1 (57 in FIG. 5).

Figure 5:
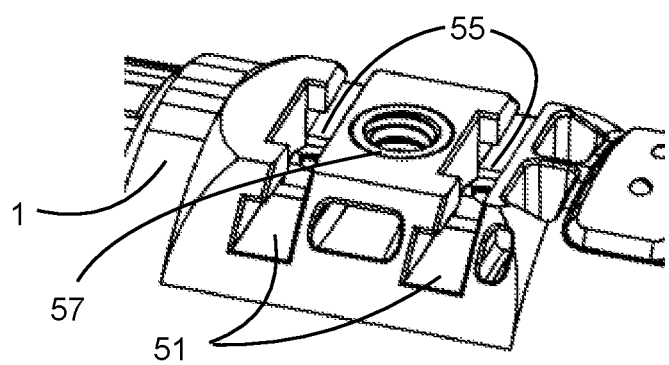
FIG. 5 is an enlarged, fragmentary perspective view of a portion of the device or accessory that electrically connects to the mount according to an embodiment of the present invention.

FIG. 5 depicts a portion of device 1 that mates with and attaches to device-mounting rail 31. A pair of parallel, spaced-apart slots or grooves 51, having an L-shaped cross-section that mates with rails 37, may be formed in an upper extent of device 1. A conductive electrical contact 55 may be provided in each slot 51. A threaded aperture 57 may be provided between slots 51 to mate with fastener 45 to provide a mechanically secure connection between device-mounting rail 31 and device 1.

In operation, mount 11 may first be configured to mount to helmet fixture 5 by selecting and securing the appropriate upper fixture or adapter portion 23 to mounting body 21. The assembly may then be connected or secured to helmet fixture 5. Device 1 may be attached to mount 11 by registering slots 51 with electrically conductive rails 37 and securing device 1 to device-mounting rail 31 using thumb screw 45. Device 1 may be secured to rail 31 on either side of mounting body 21 or, two devices may be secured to rail 31. A power cable may be connected using plug 13 and USB port 39, thus providing power to device 1 from a power pack carried remotely.

The helmet mount according to the present invention provides a number of advantages. Principally, it provides flexibility in terms of its ability to mount electrically powered devices in multiple configurations and to attach to commonly available helmet fixtures. It is simple in construction and operation.

The invention is described herein with reference to illustrative and preferred embodiments thereof. It is thus not limited, but is susceptible to variation and modification without departing from the scope and spirit of the invention, as defined by the claims.

I claim:

1. An apparatus for mounting an electrically powered device to a helmet, the apparatus comprising:
   a mounting body configured to be removably secured to an existing mounting fixture on the helmet and depending generally downwardly therefrom;
   a device-mounting rail carried by the mounting body, the device-mounting rail having upper and lower surfaces and having a length extending generally transversely to each side of the mounting body;
   at least one longitudinal slot formed in and extending through the device-mounting rail from the upper to the lower surface and having a length extending at least partially the length of the device mounting rail;
   an electrically conductive rail carried on the lower surface of the device-mounting rail and at least partially coextensive with the length of the longitudinal slot, the electrically conductive rail configured to mate with a receptacle on the device;
   a fastener extending through the longitudinal slot to engage and secure the device to the device-mounting rail;
   a source of electrical power in communication with the device through the electrically conductive rail and receptacle.

2. The apparatus of claim 1, wherein the at least one longitudinal slot further comprises:
   a pair of longitudinal slots, each longitudinal slot having a length and formed in the device-mounting rail on each side of the mounting body, and the electrically conductive rail is generally coextensive with the length of both longitudinal slots.

3. The apparatus of claim 1, wherein the source of electrical power is remote from the mounting body and electrically connected to it by a cable.

4. The apparatus of claim 1, wherein the mounting body further comprises:
   a mounting-fixture portion that is configured to be removably secured to the existing mounting fixture on the helmet, the mounting fixture portion being removably secured to the mounting body.

5. An apparatus for mounting an electrically powered device to an existing mounting fixture on a helmet, the apparatus comprising:
   a mounting body configured to be removably secured to the existing mounting fixture on the helmet and depending generally downwardly therefrom;
   a device-mounting rail carried by the mounting body and having upper and lower surfaces, and a first side extending generally transversely from one side of the mounting body, and a second side extending generally transversely from an opposing side of the mounting body;
   a longitudinal slot formed in each of the first and second sides of the device-mounting rail and extending through the device-mounting rail from the upper to the lower surface, each slot having a length;
   an electrically conductive rail carried on the lower surface of the device-mounting rail and at least partially coextensive with the length of each of the longitudinal slots, the electrically conductive rail configured to mate with a receptacle on the device;
   a fastener extending through one of the longitudinal slots to engage and secure the device to the device-mounting rail;
   a source of electrical power in communication with the device through the mounting body, electrically conductive rail, and receptacle.

6. The apparatus of claim 5, wherein the electrically conductive rail is generally coextensive with the length of both longitudinal slots.

7. The apparatus of claim 5, wherein the source of electrical power is remote from the mounting body and electrically connected to it by a cable.

8. The apparatus of claim 5, wherein the mounting body further comprises:
 a mounting-fixture portion that is configured to be removably secured to the existing mounting fixture on the helmet, the mounting fixture portion being removably secured to the mounting body.

9. The apparatus of claim 1, wherein the fastener is a threaded thumbscrew.

10. The apparatus of claim 1, wherein the fastener is a threaded thumbscrew.

11. An apparatus for mounting an electrically powered device to an existing mounting fixture on a helmet, the apparatus comprising:
 a mounting body configured to be removably secured to the existing mounting fixture on the helmet and depending generally downwardly therefrom, the mounting body having a pair of generally opposed sides;
 a device-mounting rail carried by the mounting body, the device mounting rail having upper and lower surfaces, and the device-mounting rail extending generally transversely on either side of the mounting body;
 a pair of longitudinal slots, each slot formed in the device-mounting rail on each side of the mounting body, each slot extending through the device-mounting rail from the upper surface to the lower surface;
 a pair of generally parallel and spaced apart electrically conductive rails carried on the lower surface of the device-mounting rail and adjacent the longitudinal slots, the electrically conductive rails configured to mate with a receptacle on the device;
 a threaded thumbscrew extending through one of the longitudinal slots to engage and secure the device to the device-mounting rail;
 a source of electrical power in communication with the device through the mounting body, electrically conductive rail, and receptacle.

12. The apparatus of claim 11, wherein the electrically conductive rail is generally coextensive with the length of both longitudinal slots.

13. The apparatus of claim 11, wherein the source of electrical power is remote from the mounting body and electrically connected to it by a cable.

14. The apparatus of claim 11, wherein the mounting body further comprises:
 a mounting-fixture portion that is configured to be removably secured to the existing mounting fixture on the helmet, the mounting fixture portion being removably secured to the mounting body.

\* \* \* \* \*